United States Patent [19]

Abe

[11] Patent Number: 4,466,654
[45] Date of Patent: Aug. 21, 1984

[54] AUTOMOTIVE VEHICLE COWL CONSTRUCTION

[75] Inventor: Masafumi Abe, Tokyo, Japan

[73] Assignee: Nissan Motor Company, Limited, Yokohama, Japan

[21] Appl. No.: 207,701

[22] Filed: Nov. 17, 1980

[30] Foreign Application Priority Data

Nov. 19, 1979 [JP] Japan ............................. 54-150496

[51] Int. Cl.³ .................. B60G 1/04; B62D 21/00
[52] U.S. Cl. ................................ 296/192; 296/194; 15/250.16; 15/250.17
[58] Field of Search ..................... 296/192, 194; 15/250.16, 250.17

[56] References Cited

U.S. PATENT DOCUMENTS

| | | | |
|---|---|---|---|
| 1,829,751 | 11/1931 | Ledwinka | 296/192 |
| 1,838,852 | 12/1931 | Ledwinka | 296/192 |
| 2,075,936 | 4/1937 | Graebner et al. | 296/192 |
| 2,789,007 | 4/1957 | Howell | 296/28 |
| 2,895,157 | 7/1959 | Kocourek | 296/192 X |
| 3,120,673 | 2/1964 | Buchwald | 15/250.17 |
| 3,289,564 | 12/1966 | de Castelet | |
| 3,596,978 | 8/1971 | Wessells et al. | 296/194 |
| 3,747,500 | 7/1973 | Redd | 98/2.10 |
| 3,788,681 | 1/1974 | Barenyi et al. | 15/250.16 X |
| 3,843,194 | 10/1974 | Yamada | 296/84 R |
| 4,078,840 | 3/1978 | Itoh | 296/192 |
| 4,264,101 | 4/1981 | Gotoh | 296/194 |
| 4,270,793 | 6/1981 | Harasari et al. | 296/192 |
| 4,285,540 | 8/1981 | Harada et al. | 296/192 |

FOREIGN PATENT DOCUMENTS

| | | |
|---|---|---|
| 1943485 | 3/1971 | Fed. Rep. of Germany . |
| 2256298 | 6/1973 | Fed. Rep. of Germany . |
| 2650641 | 5/1978 | Fed. Rep. of Germany . |
| 1206945 | 2/1960 | France . |
| 1338717 | 7/1965 | France . |
| 2020877 | 7/1970 | France . |
| 2115986 | 7/1972 | France . |
| 2161668 | 7/1973 | France . |
| 1140338 | 1/1969 | United Kingdom . |
| 1220658 | 1/1971 | United Kingdom . |
| 1547898 | 6/1979 | United Kingdom . |

Primary Examiner—Joseph Paul Brust
Attorney, Agent, or Firm—Schwartz, Jeffery, Schwaab, Mack, Blumenthal & Koch

[57] ABSTRACT

A single shaped panel partitions off a portion of a vehicle cowl air box and adds structural rigidity to the box. The shaped panel is formed with raised portions which define openings which fluidly communicate the partitioned section of the air box with the remainder thereof. Some of the raised portions are formed with holes for mounting windshield wiper linkages or the like and/or are formed to act as a water deflector which prevents rain water or the like from passing through the box to an air outlet fluidly communicating with the partitioned section of the air box.

6 Claims, 8 Drawing Figures

AUTOMOTIVE VEHICLE COWL CONSTRUCTION

BACKGROUND OF THE INVENTION

1. Field of the Invention

The present invention relates generally to an automotive vehicle construction and more particularly to an improved cowl construction thereof wherein fewer parts are used and construction is rendered simpler and easier while providing adequate rigidity for mounting brackets and the like.

2. Description of the Prior Art

FIGS. 1 to 4, show a prior art arrangement which comprises a dash panel 1 interposed between the engine room E and the passenger compartment C. The dash panel includes an upper dash panel 2 and a front cowl panel 4 which is welded along its forward and aft edges to the upper dash panel 2, to define therebetween an air box B having a substantially rectangular cross section. Cowl side panels 6 are secured to the panels 2 and 4 to close the lateral open ends of the air box B. The upper dash panel 2 is further formed with an air outlet opening 2a through which devices such as an air conditioner and/or ventilator induct ambient atmospheric air via the air box B. A water deflector or exclusion cover 10 (see FIG. 3) is disposed within the air box B to prevent rain water and the like from reaching the air intake opening 2a.

A pedal mounting bracket 12 is disposed on the drivers side of the dashpanel 1 and connected to the upper dash panel 2 by means of a mounting bracket 14. As best seen in FIG. 2, the point at which the mounting bracket 14 is connected to the panel 2 is reinforced by a reinforcement member 16 welded to the inner surface of the upper dash panel 2. This reinforcement member of course serves to prevent the buckling of the panel 2 under the influence of force applied thereto from a brake pedal or the like via the pedal mounting bracket 12 and the mounting bracket 14.

A windshield wiper mounting bracket 20 which supports a wiper linkage 22 (see FIG. 4) is welded to flanges 18 of the upper dash panel 2 and the cowl top panel 4.

A cowl grille 26 formed with a plurality of slits 26a, is arranged as best seen in FIG. 1 to be placed over fresh air induction openings 24 formed in the front cowl panel 4.

Each of the cowl side panels 6 are connected at the leading edges thereof to the trailing edges of hood ledge panels 28, which as shown in FIG. 1 extend along the sides of the engine room E to the front of the vehicle. The trailing edges of the cowl side panels 6 are connected to front pillars 32 via connector panels 30.

The upper dash panel 2, the front cowl panel 4 and the cowl side panels 6 (which define the air box B) in combination with the hood ledge panels, and the hood ledge panel reinforcing members 34 and the front pillars 32 (defined by outer panel 32a and inner panel 32b) are connected to the main chassis of the vehicle body.

However, this particular construction has suffered from the drawback that the water deflector 10, the reinforcement member 16 and the wiper bracket 20, are each individually fixed to the upper dash panel 2 which increases both the number of parts which must be produced, stored and assembled along with the correspondingly high number of handling and assembling operations. Accordingly both direct and indirect costs of manufacturing the vehicle are increased along with the possibility that during mass production one or more of the parts may be inadvertently omitted.

SUMMARY OF THE INVENTION

The present invention features a cowl construction in which an air box defined by an upper dash panel and a front cowl panel has a shaped panel disposed therein which divides the air box and is formed with apertures and openings for permitting the mounting of devices and the passage of air from one partitioned section of the air box to the other. This shaped panel serves to increase the rigidity of the air box, to act as a rain water deflector and to serve as a mount for the windshield wiper (or the like). The arrangement of the present invention accordingly reduces the number of parts and operations necessary to manufacture the cowl of the vehicle which facilitates cheaper and quicker production.

BRIEF DESCRIPTION OF THE DRAWINGS

The features and advantages of the arrangement of the present invention will become more clearly appreciated from the following description taken in conjunction with the accompanying drawings in which like reference numerals denote corresponding elements, and in which.

DETAILED DESCRIPTION OF THE PREFERRED EMBODIMENTS

Figure 1:
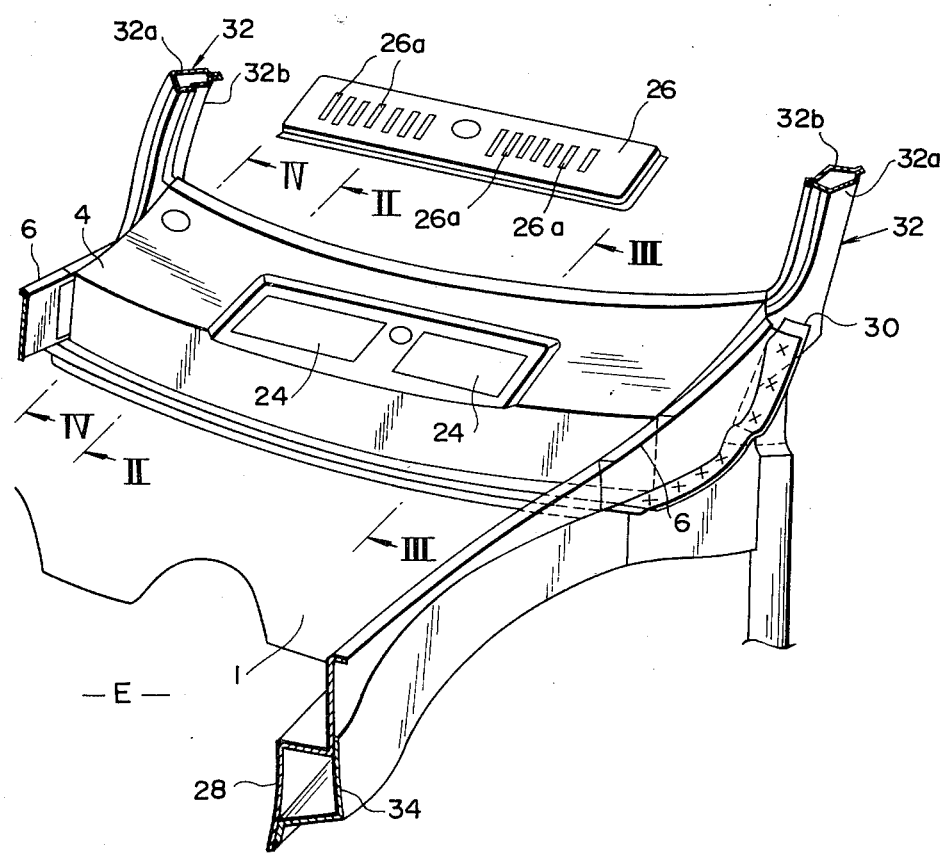
FIG. 1 is a perspective view, partly in section showing the prior art arrangement discussed under the heading of "Description of the Prior Art"
Figure 2:
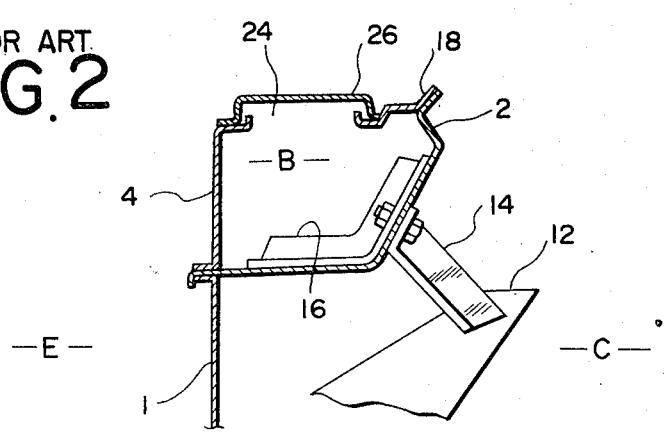
FIG. 2 is a sectional view taken along section line II—II of FIG. 1.
Figure 3:
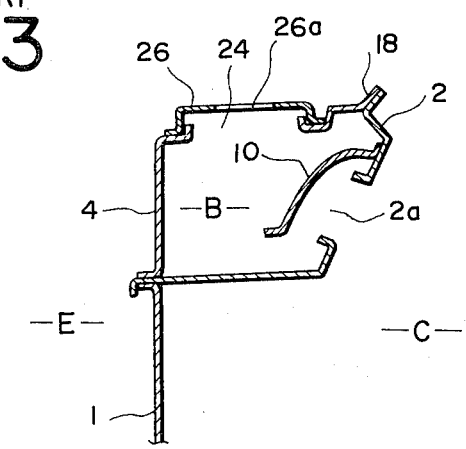
FIG. 3 is a sectional view taken along section line III—III of FIG. 1.
Figure 4:
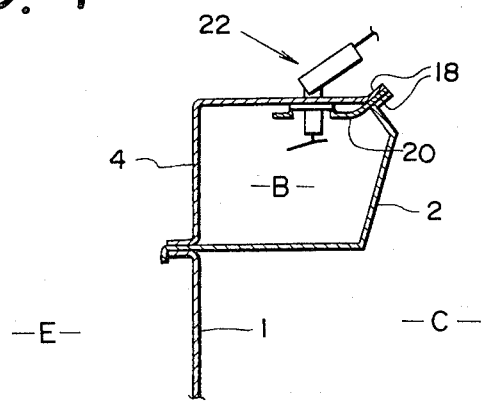
FIG. 4 is a sectional view taken along section line IV—IV of FIG. 1.
Figure 5:
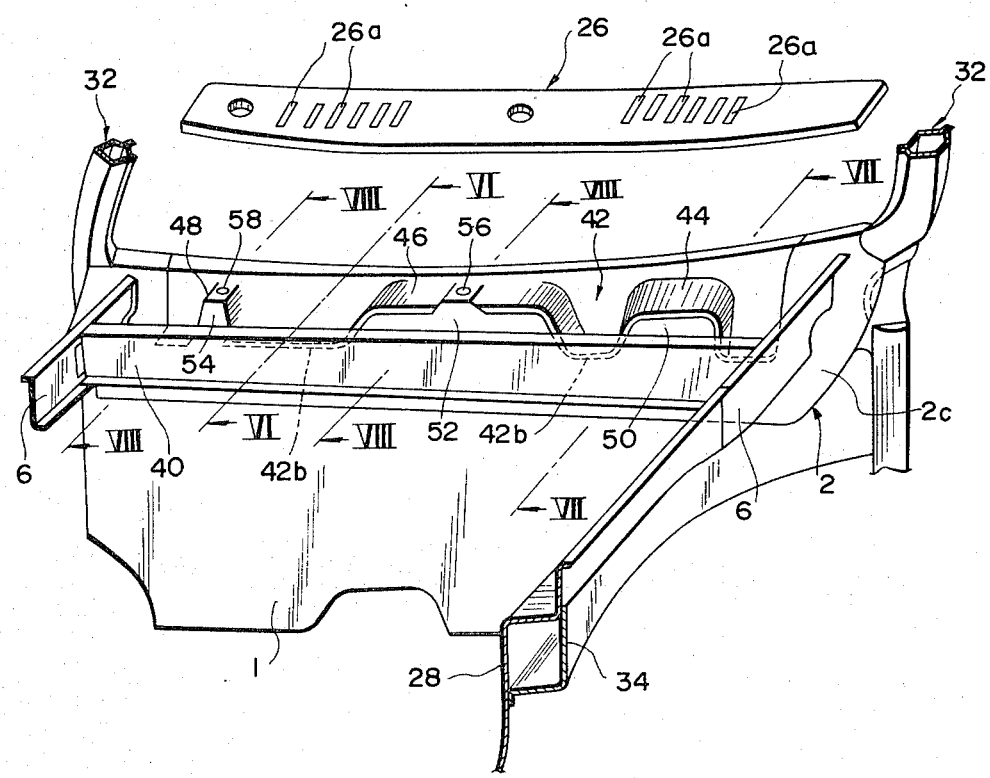
FIG. 5 is a perspective view partly in section of a preferred embodiment of the present invention.
Figure 6:
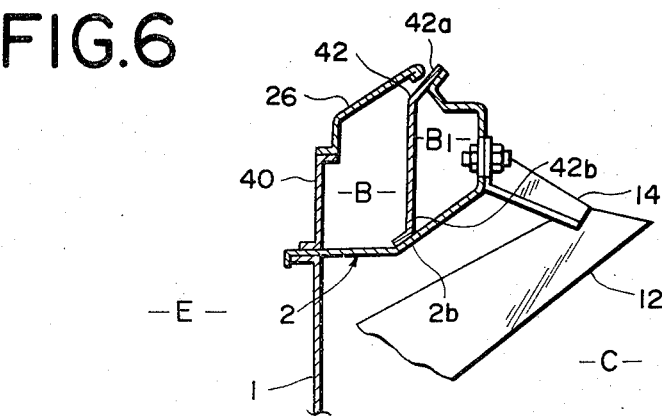
FIG. 6 is a sectional view taken along section line VI—VI of FIG. 5.

Turning now to FIGS. 5 to 8 of the drawings a preferred embodiment of the present invention is shown. In this arrangement a front cowl panel 40 and the upper dash panel 2 cooperate to define the air box B. A shaped rear cowl panel 42 is connected at its upper edge 42a with a generally upwardly and rearwardly extending flange of the upper dash panel 2. The rear cowl panel 42 extends into the air box to partition off a section B1. As shown in FIGS. 5 and 6 the rear cowl panel 42 is connected at its lower edge 42b to portions 2b of the upper dash panel 2 and shaped to have raised portions 44,46,48 which extend toward the front cowl panel 40 and define openings 50,52 and 54 which provide fluid communication between the air box B and the partitioned section B1 thereof.

As used hereinbelow, dash panel 2 comprises a first panel, the front cowl panel comprises a second panel and the shaped rear cowl panel 42 comprises a third panel.

Figure 7:
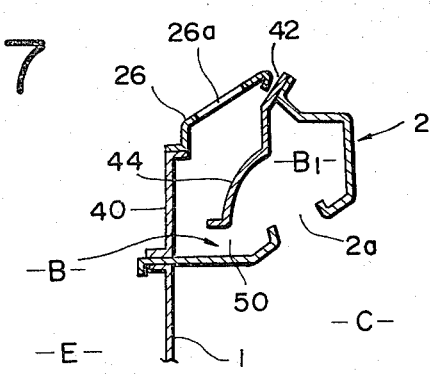
FIG. 7 is a sectional view taken along the section line VII—VII of FIG. 5.
Figure 8:
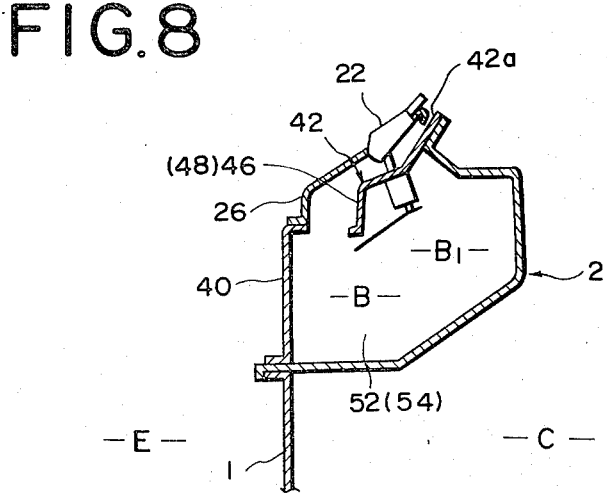
FIG. 8 is a sectional view taken along section line VIII—VIII of FIG. 5.

As shown in FIG. 7 the raised portion 44 is smoothly curved to cover the mouth of the air outlet opening 2a to define a water deflector. As shown the opening 50 defined between the water deflector portion and the upper dash panel 2 is located upstream of the opening 2a, thus preventing the passage of water to said opening 2a. The raised portions 46 and 48 are formed with windshield wiper pivot mounting holes 56 and 58. Wiper linkages 22 are respectively disposed in the mounting holes.

To provided a rigid connection between the mounting bracket 14, the pedal mounting bracket 12 and the upper dash panel 2, the site at which bracket 14 is connected to the panel 2 is selected to be as shown in FIG. 6. That is, in a zone of high structural rigidity wherein the rear cowl panel 42 is connected to the upper cowl panel 2 at both its upper and lower edges.

The upper side of the air box B is closed by a grille 26 formed with a plurality of slots 26a.

Thus in summary, the present invention features a cowl construction wherein a single shaped panel is welded or otherwise secured in an air box to partition same and add structural rigidity to the box. The panel is formed with suitable apertures and holes via which air may flow to air conditioning devices after any rain water or the like entering the air box with the air has been deflected and by means of which devices such as windshield wiper linkages or the like can be mounted. This of course eliminates the need for a number of individual elements and assembly steps which leads toward speedier and easier production of the vehicle.

Moreover with the embodiment described herein it is possible to extend the air box in the lateral direction of the vehicle so that it may be connected directly to the front pillars 32. This of course eliminates the need for connector panels 30 such as employed in the prior art disclosed herein. The ease and dependability with which the air box can be connected to the rest of the vehicle is thus increased.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A cowl assembly for a vehicle comprising:
    a first panel, having an air outlet opening, and extending generally transversly across said vehicle;
    a second panel, having an air inlet opening, and being fastened to said first panel, said second panel extending in a generally spaced parallel relationship with said first panel and defining therebetween an air space;
    a third panel, having first and second side edges, said third panel being fastened along said first edge to said first panel and extending through said air space to partition at least a portion of the air space from a remainder thereof, said third panel further having portions of said second edge fastened to said first panel to structurally support said first panel, said third panel further having at least one raised portion formed between said fastened portions of said second edge, said at least one raised portion extending generally toward said second panel and forming at least one opening between said third panel and said first panel for providing fluid communication between said partitioned portion of said air space and said remainder whereby air entering said air space through said air inlet opening may flow to said air outlet opening.

2. The cowl assembly of claim 1, further comprising a second raised portion which is adapted to support a device.

3. The cowl assembly of claim 2, wherein said device operates a mechanism disposed outside of said air space.

4. The cowl assembly of claim 1, wherein said at least one raised portion is spaced and positioned with respect to said air inlet opening, so that water entering said air space through said air inlet opening is deflected and prevented from reaching said air outlet opening.

5. The cowl assembly of claim 1, further comprising a cover for covering said air inlet opening, said cover having a plurality of spaces formed therein through which air may flow.

6. A cowl construction for an automotive vehicle comprising:
    means defining an air space through which air flows;
    an elongate shaped panel having first and second edges, said elongate panel being disposed in said air space so that said first side edge is connected substantially along its entire length to said air space defining means and said second side edge is connected along a portion of its length to said air space defining means, said elongate panel dividing said air space into first and second sections;
    means defining at least one raised portion in said elongate panel, said raised portion being spaced from said air space defining means to permit air flow therepast between said first and second sections of said air space; and
    means defining a mounting site in said elongate panel for mounting a device thereon for operating a mechanism positioned externally of said air space.

* * * * *